United States Patent [19]

Gao

[11] Patent Number: 6,020,087
[45] Date of Patent: Feb. 1, 2000

[54] POLYMER ELECTROLYTES CONTAINING LITHIATED FILLERS

[75] Inventor: Feng Gao, Henderson, Nev.

[73] Assignee: Valence Technology, Inc., Henderson, Nev.

[21] Appl. No.: 09/016,185

[22] Filed: Jan. 30, 1998

[51] Int. Cl.$^7$ ........................................ H01M 6/22
[52] U.S. Cl. ...................... 429/188; 429/223; 429/224; 429/231.3; 429/231.5; 429/231.8
[58] Field of Search ..................... 429/304, 321, 429/322, 309, 306, 316, 188, 300, 303

[56] References Cited

U.S. PATENT DOCUMENTS

| | | | |
|---|---|---|---|
| 4,172,882 | 10/1979 | Hong | 423/331 |
| 5,238,759 | 8/1993 | Plichta et al. | 429/192 |
| 5,278,004 | 1/1994 | Plichta et al. | 429/191 |
| 5,728,489 | 3/1998 | Gao et al. | 429/192 |

OTHER PUBLICATIONS

Walker, Jr. et al. United States Statutory Invention Registration No. H1576, Aug. 6, 1996.

Hong H. Y–P. Crystal Structure and Ionic Conductivity of $Li_{14}Zn(GeO_4)_4$ and Other New $Li^+$ Superionic Conductors. Mat. Res. Bul. vol. 13, pp. 117–124, 1978 (month N/A).

Kumar, et al., Polymer–ceramic Composite Electrolytes, Journal of Power Sources, 52 (1994), 261–268 (month N/A).

Adachi, et al. Fast $Li^+$ Conducting Ceramic Electrolytes, Advanced Materials, 1996, vol. 8, No. 2 (month N/A).

*Primary Examiner*—Maria Nuzzolillo
*Assistant Examiner*—J. O'Malley
*Attorney, Agent, or Firm*—Young & Basile, P.C.

[57] ABSTRACT

A method of improving the structural integrity of polymer electrolytes of electrochemical cells by employing lithiated fillers that are represented by the formula $Li_{16-2x}D_x(TO_4)_4$ where $0<x<4$, D is Zn or Mg and T is Si or Ge.

18 Claims, No Drawings

POLYMER ELECTROLYTES CONTAINING LITHIATED FILLERS

FIELD OF THE INVENTION

This invention relates to fabricating non-aqueous electrochemical (electrolytic) cells and, more particularly, to employing a lithiated fillers in the polymeric matrix of the electrolyte layer. The electrochemical cells will demonstrate superior performance.

BACKGROUND OF THE INVENTION

Non-aqueous lithium ion electrochemical cells typically include an anode, a lithium electrolyte prepared from a lithium salt dissolved in one or more organic solvents and a cathode of an electrochemically active material, typically an insertion compound. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

Recently, the lithium metal anode has been replaced with a carbon anode such as coke or graphite intercalated with lithium ions to form $Li_xC$. In operation of the cell, lithium ion passes from the carbon through the electrolyte to the cathode where it is taken up just as in a cell with a metallic lithium anode. During recharge, the lithium ion is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur.

Various factors influence the performance of electrochemical cells. For instance, the morphology of the polymeric matrix in the electrolyte layer and of the polymeric binders in the anode and/or cathode can affect conductivity of the salts. Enhancement of conductivity has been demonstrated by forming porous polymeric matrices and polymeric binders. One method of producing such porous structures comprises forming polymeric structures in the presence of a plasticizer; upon extraction of the plasticizer, pores are created in the polymer. Fillers are often added to improve the strength of the polymeric matrix. However, conventional fillers while strengthening the matrix comes at the expense of reducing cell performance. For example, fumed silica which is a common filler is thermodynamically unstable towards lithiated carbon. Specifically although fumed silica is treated so that silanol groups on the surface are replaced by hydrophobic groups, some unprotected silanol groups remain present. These silanol groups react with and consume lithium thereby reducing the amount of useful lithium.

SUMMARY OF THE INVENTION

The present invention is based, in part, on the recognition that the use of lithiated fillers in solid, solvent-containing electrolytes provides a beneficial increase in mechanical strength without a loss in conductivity and cumulative capacity of the solid battery. The conductivity and cumulative capacity of the solid battery are increased by the addition of a lithiated filler. These improvements are brought about by the ability of the lithiated filler to provide lithium cations.

The present invention is directed to electrochemical cells and methods of fabricating them wherein the non-aqueous electrolyte comprises a polymeric matrix and the lithiated fillers.

DETAILED DESCRIPTION OF PREFERRED EMBODIMENTS

Preferred secondary lithium ion electrochemical cells and batteries include (1) a cathode comprising an active material, (2) an intercalation based carbon anode, with each electrode comprising a polymer binder and capable of reversibly incorporating (e.g., intercalating) an alkali metal ion, and (3) a polymeric matrix containing lithiated fillers and an electrolyte solution comprising an organic electrolyte solvent and a salt. Each electrode preferably has a current collector.

Prior to describing this invention in further detail, the following terms will be defined.

The term "lithiated filler" refers to compounds that are represented by the formula $Li_{16-2x}D_x(TO_4)_4$, where $0<x<4$, D is Zn or Mg and T is Si or Ge. Preferably x is about 1. A preferred lithiated filler is $Li_{14}Zn(GeO_4)_4$. These compounds are synthesized in accordance with the following reaction:

$(8-x)Li_2CO_3 + xDO + 4TO_2 \rightarrow Li_{16-2x}D_x(TO_4)_4$. Preferably, the reactants are mixed in a crucible and reacted by firing overnight in air at 1100° C. For example, when D is Zn, T is Ge and x is 1, then the reaction is:

$7\ Li_2CO_3 + ZnO + 4GeO_2 \rightarrow Li_{14}Zn(GeO_4)_4$. Synthesis and characterization of these compounds are further described in H. Y-P. Hong, Mat. Res. Bul. Vol. 13 pp 117–124, 1978.

Preferably, the lithiated fillers have a diameter of about 50 µm or less, and typically ranges from about 0.02 µm to 5 µm. The lithiated filler typically comprises about 1% to about 30%, preferably about 5% to about 25%, and more preferably about 10% to about 20% by weight of the polymeric electrolyte.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability by liquid solvents including, for example, diethyl ether, dimethyl ether, methanol, cyclohexane, and mixtures thereof or by supercritical fluids. Preferred plasticizers include, for example, dibutyl phthalate, dioctylphthalate, and acetates, glymes and low molecular weight polymers. The plasticizer is preferably first well mixed with a polymer and a solvent. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the electrolyte solution. The precursor typically comprises (each in precursor form) an anode, a cathode, and polymeric matrix. The anode and/or cathode may each include a current collector. The polymeric matrix can function as a separator between the anode and cathode.

The term "activation" refers to the placement of a salt and electrolyte solvent into an electrochemical cell precursor. After activation, the electrochemical cell is charged by an external energy source prior to use.

The term "electrochemical cell" or "electrolytic cell" refers to a composite structure containing an anode, a cathode, and polymeric matrix with a electrolyte solution that is interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an organic or inorganic monomer (or partial polymer thereof) and which, when used in combination with the other components of the electrolyte, renders the electrolyte solid. Suitable solid polymeric matrices are well known in the art and include solid matrices formed from organic polymers, inorganic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. Nos. 5,501,921, 5,498,491, 5,491,039, 5,489,491, 5,482,795, 5,463,179, 5,419,984, 5,393,621, 5,358,620, 5,262,253, 5,346,787, 5,340,669, 5,300,375, 5,294,501, 5,262,253, and 4,908,283, which are incorporated herein. Inorganic monomers are disclosed in U.S. Pat. Nos. 4,247,499, 4,388,385, 4,414,607, 4,394,280, 4,432,891, 4,539,276, and 4,557,985, which are incorporated herein.

The solid matrix forming monomer or partial polymer can be cured or further cured prior to or after addition of the salt, solvent and, optionally, a viscosifier, For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and removal of the volatile solvent would result in the formation of a solid electrolyte. In either case, the resulting solid electrolyte would be a homogeneous, single phase product which is maintained upon curing, and does not readily separate upon cooling to temperatures below room temperature.

The term "substrate" refers to any suitable film made of material that is compatible with the components of the polymer mixture. The substrate serves as the vehicle or base onto which the electrode mixture is applied. After the solvent has evaporated from the mixture, the polymer matrix is formed. Suitable substrates include, for example, paper, e.g, 20 or 24 weight paper, polyester (MYLAR™), polypropylene, polyethylene films and non-woven webs.

Preferably, the solid polymeric matrix is formed by a casting process which does not require the use of monomers or prepolymers, that is, no curing is required. A preferred method employs a copolymer of vinylidenedifluroide and hexafluoropropylene dissolved in acetone or other suitable solvent(s). Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are lithium salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, ethyl methyl carbonate, propylene carbonate, ethylene carbonate, methyl ethyl carbonate, gamma-butyrolactone, triglyme, tetraglyme, dimethylsulfoxide, dioxolane, sulfolane, and the like. A preferred solvent comprises a mixture of ethylene carbonate and ethyl methyl carbonate. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate. For electrochemical cells where the cathode comprises vanadium oxides, e.g., $V_6O_{13}$ and the anode is lithium, the electrolytic solvent preferably comprises a mixture of propylene carbonate and triglyme.

The term "organic carbonate" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl1,3-dioxolan-2-one; 4,4-dimethyl-1,3-dioxolan-2-one; 4-methyl-5-ethyl1,3-dioxolan-2-one; 4,5-diethyl-1,3-dioxolan-2-one; 4,4-diethyl-1,3-dioxolan-2one; 1,3-dioxan-2-one; 4,4-dimethyl-1,3-dioxan-2-one; 5,5-dimethy1-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. The carbon intercalation based anode precursors typically include a polymeric binder and extractable plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), EAA (ethylene acrylic acid copolymer), EVA (ethylene vinyl acetate copolymer), EAA/EVA copolymers, and the like. The polymeric binder of the anode for the present invention preferably comprises a polymer blend which includes fluoropolymers as further described above. In one preferred embodiment, the carbon intercalation anode precursor (that is, the anode structure prior extraction) comprises from about 40 to about 70 weight percent of a carbon material (e.g., graphite); from about 8 to about 20 weight percent of a polymeric binder; and from about 15 to about 40 weight percent plasticizer. The anode may also include an electron conducting material such as carbon black.

The cathode typically comprises a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq2$. Blends can also include $Li_y$-α-$MnO_2$ ($0\leq y<1$) which has a hollandite-type structure and is described in U.S. Pat. No. 5,561,007, which is incorporated herein.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. The polymeric binder may comprise EPDM, PVDF, EAA, EVA, or EAA.EVA copolymers, and the like. Suitable binders for use in the cathode have a molecular weight of from about 1,000 to 5,000,000. The polymeric binder of the cathode for the present invention preferably comprises a polymer blend which includes fluoropolymers as further described above.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of a suitable polymeric binder comprising the polymer blend; from about 0 to about 20 weight percent of polyethylene oxide having a number average molecular weight of at least 100,000; and from about 10 to 50 weight percent of solvent comprising a 10:1 to 1:4 (w/w) mixture of an organic carbonate and a glyme. Also included is an ion conducting amount of an inorganic ion salt. Generally, the amount of the salt is from about 1 to about 25 weight percent.

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed. The electrolyte composition further typically comprises from 0 to about 80 weight percent electrolyte solvent (e.g., organic carbonate/glyme mixture) based on the total weight of the electrolyte; preferably from about 60 to about 80 weight percent; and even more preferably about 70 weight percent. The electrolyte composition moreover comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

METHODOLOGY

Electrochemical cells are known in the art. See, for example, U.S. Pat. Nos. 5,300,373, 5,316,556, 5,346,385, 5,262,253, 4,472,487, 4,668,595, and 5,028,500, all of which are incorporated herein. The following illustrates a method of how an electrolytic cell could be fabricated with the inventive process.

The anode generally comprises an anode film that is laminated onto one or both sides of an anode current collector. Typically, each anode film is from about 100 µm to about 250 μm in thickness, preferably about 110 μm to about 200 μm, and more preferably about 125 μm to about 175 μm. Similarly, the cathode of the present invention generally comprises a cathode film that is laminated onto one or both sides of a cathode current collector. Typically, each cathode film is from about 100 μm to about 200 μm in thickness, preferably about 130 μm to about 175 μm, and more preferably about 140 μm to about 165 μm. Typically, the solid electrolyte is from about 10 μm to about 100 μm in thickness, preferably about 15 μm to about 60 μm, and more preferably about 20 μm to about 30 μm. The current collector can comprise a conventional current collector such as, for example, a screen, grid, expanded metal, woven or non-woven or knitted wire fabric formed from an electron conductive material such as metals or alloys. Preferably, the current collector has a thickness from about 25 μm to about 75 μm, preferably about 35 μm to about 65 μm, and more preferably about 45 μm to about 55 μm.

The following illustrates a method of how an electrolytic cell could be fabricated with the inventive process. Examples 1 and 2 describe the process of preparing the anode and cathodes, respectively. Example 3 describes the procedures for fabricating a solid electrolytic cell.

The invention will be described using the anode and cathode structures wherein electrode materials (or films) are laminated onto both sides of the current collectors, however, it is understood that the invention is applicable to other configurations, for example, where one side of the anode and/or cathode current collector is laminated.

EXAMPLE 1

The anode current collector employed is a sheet of expanded copper metal that is about 50 μm thick. It is available under the designation 2Cu5–125 (flatten) from Delker Corp., Branford, Conn. The anode slurry is prepared as follows:

A polymer mixture comprising a copolymer of vinylidenedifluoride (VDF) and hexafluoropropylene (HFP) is prepared by mixing 6.8 grams of the copolymer in 20 grams of acetone. The copolymer (ave. MW 125K) is Kynar Flex 2801 ™ from Elf Atochem North America, in Philadelphia, Pa. The mixture is stirred for about 24 hours in a milling jar available from VWR Scientific, in San Francisco, Calif., model H-04172-00. The copolymer functions as a binder for the carbon in the anode.

A graphite mixture is prepared separately by first adding 23.4 grams of graphite into 0.9 grams of carbon black into a solution containing 60 grams acetone, and 10.5 grams dibutyl phthalate. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M.M.M. Carbon, Willebrock, Belgium. The graphite mixture is then vigorously mixed in a high shear mixer until a substantially homogeneous blend is formed. A suitable mixer is available from Ross Model ME100DLX, Hauppauge, N.Y., operating at its highest setting (about 10,000 RPM) for 30 minutes.

The anode slurry is prepared by mixing the polymer mixture and the graphite mixture together under low shear conditions to form the anode slurry wherein the components are well mixed. A portion of the acetone is allowed to evaporate from the slurry before it is laminated onto each side of the current collector. Anode films form when the remaining portion of the acetone evaporates.

EXAMPLE 2

The cathode current collector employed is a sheet of expanded aluminum that is about 50 μm thick. The aluminum grid is available under the designation 2AL5-077 from Delker Corp. The cathode slurry is prepared as follows:

A polymer mixture comprising a copolymer of vinylidenedifluoride (VDF) and hexafluoropropylene (HFP) is prepared by mixing 4.4 grams of the copolymer in 15 ml of acetone. The copolymer was Kynar Flex 2801™. The mixture is stirred for about 24 hours in a milling jar.

A cathode mixture is prepared separately by mixing 28.9 grams of LiMn$_2$O$_4$, 2.4 grams of carbon black (Super P™) into a solution containing 60 grams acetone, and 8.7 grams dibutyl phthalate. The mixture is then vigorously mixed in the a high shear mixer until a substantially homogeneous blend is formed.

The cathode slurry is prepared by mixing the polymer mixture and the cathode mixture together under low shear conditions to form the cathode slurry wherein the components are well mixed. A portion of the acetone is allowed to evaporate from the slurry before it is laminated onto each side of the current collector. Cathode films form when the remaining portion of the acetone evaporates.

The above anode and cathode films are formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the current collector.

EXAMPLE 3

A solid electrochemical cell is prepared by first positioning a polymeric matrix between the anode and cathode and thereafter fusing the structures under moderate pressure and temperature (e.g., 130° C.) to form an electrochemical cell precursor. The polymeric matrix is formed by casting a polymeric slurry comprising acetone, dibutyl phthalate, lithiated filler, and the VDF/HFP copolymer on a suitable substrate or carrier web and allowing the acetone to evaporate. No curing by radiation is required. It is believed that the lithiated filler assist the activation process by creating physico-chemical conditions such that the electrolyte solution quickly and completely fills the pores created by the extraction of the dibutyl phthalate. Preferably, the polymeric slurry is mixed under low shear conditions as not to degrade the copolymer.

Preferably in preparing the polymer mixture for both the anode and cathode slurries is that the polymer (or copolymer) not be subject to high shear so as to be degraded. Furthermore, preferably the polymer or copolymer employed has a high average molecular weight. Preferably the average molecular weight is between 50 K to 750 K, more preferably 50 K to 200 K, and most preferably 50 K to 120 K. Furthermore, it is preferred that polymer or copolymer has a narrow molecular weight have range. Preferably Mn/Mw=1.0

Next the dibutyl phthalate plasticizer is extracted from the precursor. Extraction can be accomplished using conventional organic liquid solvents such as diethyl ether or by a dense fluid or gas which refers to a gas compressed and heated to either supercritical or subcritical conditions to achieve liquid-like densities. Dense gases and fluids are known in the art. See, for example, U.S. Pat. Nos. 5,013,366, 5,267,455, 4,219,333, 4,012,194, and 3,969,196, which are incorporated herein. A preferred dense gas is carbon dioxide. The precursor is than pre-packaged in moisture-impermeable material which is described, for example, in U.S. Pat. No. 5,326,653 which is incorporated herein, before being activated. Activation preferably occurs in an inert (e.g., argon) atmosphere. Finally, the packaging of the electrochemical cell is sealed.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. An electrochemical cell which comprises: an anode; a cathode; and interposed therebetween a solvent-containing electrolyte which comprises:
   a polymeric matrix;
   a salt;
   a solvent; and
   a lithiated filler that comprise a compound having the formula: $Li_{16-2x}D_x(TO_4)_4$ where $0<x<4$, D is Zn or Mg, and T is Si or Ge.

2. The electrochemical cell of claim 1 wherein x is about 1.

3. The electrochemical cell of claim 1, wherein the lithiated filler is $Li_{14}Zn(GeO_4)_4$.

4. The electrochemical cell of claim 1, wherein the lithiated filler comprises from about 10% to about 20% by weight of the electrolyte.

5. The electrochemical cell of claim 1, wherein the lithiated filler comprises from about 1% to about 30% by weight of the electrolyte.

6. The electrochemical cell of claim 1 wherein the anode comprises an intercalation based anode comprising carbon.

7. The electrochemical cell of claim 1 wherein the cathode comprises material selected from the group consisting of vanadium oxide, lithiated manganese oxide, lithiated nickel oxide, lithiated cobalt oxide, and mixtures thereof.

8. The electrochemical cell of claim 1 wherein the cathode comprises $LiMn_2O_4$.

9. The electrochemical cell of claim 7, wherein the anode comprises an intercalation based anode comprising carbon.

10. A process for preparing an electrochemical cell which comprises:
    (a) providing a cathode;
    (b) providing an anode;
    (c) forming an electrolyte between the cathode and anode wherein the electrolyte comprises:
       a polymeric matrix,
       a salt,
       a solvent; and
       a lithiated filler that comprises a compound having the formula $Li_{16-2x}D_x(TO_4)_4$ where $0<x<4$, D is Zn or Mg, and T is Si or Ge.

11. The process of claim 10 wherein x is about 1.

12. The process of claim 10 wherein the lithiated filler is $Li_{14}Zn(GeO_4)_4$.

13. The process of claim 10, wherein the lithiated filler comprises from about 10% to about 20% by weight of the electrolyte.

14. The process of claim 10, wherein the lithiated filler comprises from about 1% to about 30% by weight of the electrolyte.

15. The process of claim 10 wherein the anode comprises an intercalation based anode comprising carbon.

16. The process of claim 10 wherein the cathode comprises material selected from the group consisting of vanadium oxide, lithiated manganese oxide, lithiated nickel oxide, lithiated cobalt oxide, and mixtures thereof.

17. The process of claim 10 wherein the cathode comprises $LiMn_2O_4$.

18. The process of claim 16 wherein the anode comprises an intercalation based anode comprising carbon.

* * * * *